United States Patent [19]
Sundqvist

[11] Patent Number: 5,589,035
[45] Date of Patent: Dec. 31, 1996

[54] LIQUID TREATMENT DEVICE

[75] Inventor: Ingemar Sundqvist, Bergeforsen, Sweden

[73] Assignee: Sunds Defibrator Industries AB, Sweden

[21] Appl. No.: 296,707

[22] Filed: Aug. 26, 1994

[30] Foreign Application Priority Data

Sep. 8, 1993 [SE] Sweden ................... 9302898

[51] Int. Cl.⁶ .................................................. B30B 3/02
[52] U.S. Cl. .................. 162/232; 68/43; 100/121; 100/156; 162/56
[58] Field of Search .................. 68/43; 100/121, 100/156; 210/386; 162/203, 204, 208, 211, 212, 216, 302, 303, 308, 322, 336, 341, 380, 56, 57, 232; 8/156

[56] References Cited

U.S. PATENT DOCUMENTS

| | | | |
|---|---|---|---|
| 2,350,603 | 6/1944 | Fry | 100/156 |
| 2,675,970 | 4/1954 | Edwards | 100/156 |
| 2,724,327 | 11/1955 | Hetzler | 100/156 |
| 3,772,144 | 1/1973 | Luthi et al. | 162/210 |
| 3,980,518 | 9/1976 | Ljung et al. | |

*Primary Examiner*—Brenda A. Lamb
*Attorney, Agent, or Firm*—Lerner, David, Littenberg, Krumholz & Mentlik

[57] ABSTRACT

Apparatus for liquid treatment and dewatering of material suspensions is disclosed including a pair of rotatable liquid permeable press rolls within a vat and in which the vat includes a bottom defining the space directed towards the nip between the press rolls and the remaining portion of the vat, and seals between the portions of the vat including a shoulder extending towards the bottom portion of the vat and an adjustable bar extending towards the remaining portion of the vat so the position of the bottom of the vat and the converging space in the direction towards the nip between the press rolls can be determined thereby.

3 Claims, 1 Drawing Sheet

LIQUID TREATMENT DEVICE

FIELD OF THE INVENTION

This invention relates to a device for the liquid treatment and dewatering of material suspensions, such as pulp suspensions. More particularly, the present invention relates to such devices which include two cooperating press rolls, which between themselves form a nip. The rolls are partially immersed in a vat, into which the material suspension is introduced.

BACKGROUND OF THE INVENTION

In the above-described type of devices, the press rolls are formed with liquid permeable shell surfaces, through which liquid is pressed by means of an overpressure, whereby a material web is deposited on the rolls. Liquid treatment, such as washing, is brought about by supplying treatment liquid to the outside of the material web, thereby replacing the original liquid. Finally, the treatment liquid is also pressed out, and in that way the dry matter content of the web is increased. The final dewatering step takes place in the nip, where the dry matter content can amount to between about 35% and 50%.

A space is maintained between the vat and press rolls, through which the material suspension passes. This space converges towards the nip, with disruption in the form of expansion zones where the treatment liquid is supplied. The converging space can also comprise movable baffles extending in the circumferential direction of the rolls.

In order to be able to clean the space between the vat and the press rolls during occasional clogging, the space must be accessible from the outside. This can be effected by rendering the bottom portion of the vat openable, for example it can be vertically adjustable or swivellable. An openable vat bottom, however, creates sealing problems, particularly since the space between the vat and rolls is pressurized in order to facilitate dewatering. Usually a seal in the form of a lip is used, or a seal located between a shoulder on the vat and a corresponding edge on the vat bottom. The vat and vat bottom are held together at that point by means of a bolt connection. These structures, however, do not allow for control and setting of the converging space between the vat and press rolls.

The present invention offers a solution to the aforesaid problems and at the same time renders it possible to open and close the bottom portion of the vat.

SUMMARY OF THE INVENTION

In accordance with the present invention, these and other objects have now been realized by the discovery of apparatus for the liquid treatment and dewatering of material suspensions, such as pulp suspensions. The apparatus includes a vat, first and second rotatably mounted cylindrical liquid permeable press rolls juxtaposed with each other to form a nip therebetween and at least partially enclosed within the vat, the vat including a bottom portion defining a converging space in the direction towards the nip between the first and second press rolls, whereby the vat is divided between the bottom portion of the vat and the remaining portion of the vat, the bottom portion of the vat being openable so as to provide access to the vat, and sealing means for providing a liquid seal between the bottom portions of the vat and the remaining portion of the vat, the sealing means comprising a shoulder extending about the remaining portion of the vat and extending towards the bottom portion of the vat, and bar means adjustably extending about the bottom portion of the vat and extending towards the remaining portion of the vat, the bar means being adjustable, whereby the position of the bottom portion of the vat, and the conveying space, is determined thereby.

In a preferred embodiment of the apparatus of the present invention, the apparatus includes sealing members disposed between the shoulder and the bar means and the bottom of the vat. In a preferred embodiment, the sealing means comprise O-rings.

BRIEF DESCRIPTION OF THE DRAWINGS

The present invention may be more fully understood by referring to the following detailed description, which refers to the drawings, in which.

DETAILED DESCRIPTION

Figure 1:
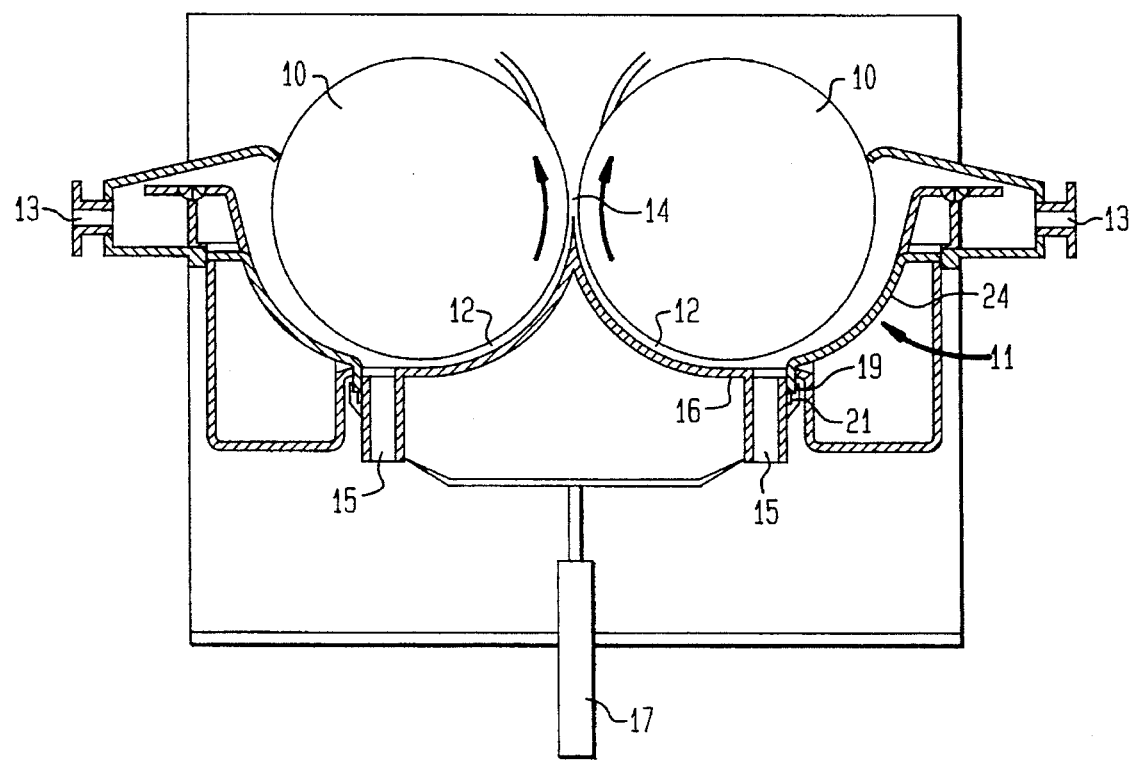
FIG. 1 is a side, elevational, cross-sectional view of a dewatering press according to the present invention.
Figure 2:
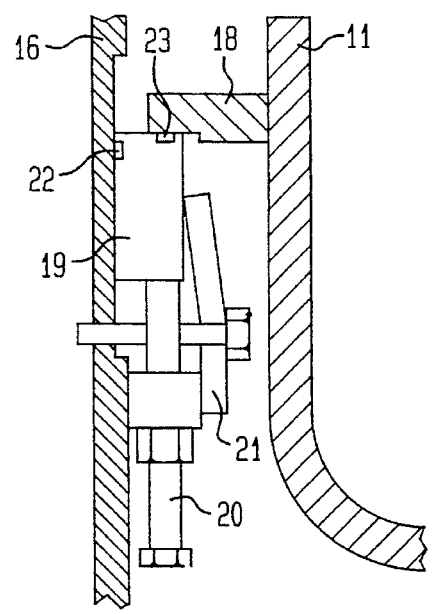
FIG. 2 is an enlarged, side, elevational view of details of the sealing at the bottom of the vat of the apparatus shown in FIG. 1.

The device according to the present invention comprises two cylindrical rotary liquid permeable press rolls 10. The rolls 10 are partially immersed in a vat 11, which is formed so that a converging space 12 is formed between the vat and each roll. Each space 12 is connected to an inlet 13 for the material suspension. Between the rolls 10 a nip 14 is formed.

Each space 12 is provided with an inlet 15 for treatment liquid, at the location where the converging space 12 happens to be widened to allow the supply of treatment liquid.

The bottom portion 16 of the vat 11 can be raised and lowered by means of a hydraulic cylinder 17. The sealing between the remaining portion 24 of the vat and the bottom portion 16 consists of a rigid shoulder 18 on the vat and extending all about the same, which shoulder cooperates with a bar 19 on the bottom portion 16 and extending all about the same. The bar 19 is vertically adjustable by means of a set screw 20. A holder 21 is provided thereon for fixing the bar 19 in a set position. By moving the bar 19, the position of the bottom portion 16 can therefore be determined, which also determines the size of the converging space 12.

The sealing function is realized by sealing members 22, 23, which can be in the form of O-ring cords, being arranged between the shoulder 18 and bar 19 and, respectively, between the bar 19 and the bottom portion 16. The sealing members 22, 23 are preferably placed in grooves in the bar 19.

Because it is thus now possible to control the converging space 12, liquid treatment and dewatering can now be optimized for every type of material suspension, and the treatment liquid can be supplied all the way to the nip 14.

The invention, of course, is not restricted to the embodiment shown, but can be varied within the scope of the invention idea.

I claim:

1. Apparatus for liquid treatment and dewatering of material suspensions comprising a vat, first and second rotatably mounted cylindrical liquid permeable press rolls juxtaposed with each other to form a nip therebetween and at least partially enclosed within said vat, said vat including a bottom portion defining a converging space in the direction towards said nip between said first and second press rolls, whereby said vat is divided between said bottom portion of said vat and a remaining portion of said vat, wherein said bottom portion of said vat includes treatment liquid inlets which form a part of said bottom portion and wherein said bottom portion is openable so as to provide access to said vat, and sealing means for providing a liquid seal between said bottom portion of said vat and said remaining portion of said vat, said sealing means comprising a shoulder extending about said remaining portion of said vat and extending towards said bottom portion of said vat, and bar means in sealable communication with said shoulder an adjustably extending about said bottom portion of said vat and extending towards said remaining portion of said vat, said bar means being connected to said treatment fluid inlets and said bar means being adjustable whereby the position of said bottom portion of said vat, and said converging space, is determined thereby.

2. The apparatus of claim 1 including sealing members disposed between said shoulder and said bar means, and between said bar means and said bottom portion of said vat.

3. The apparatus of claim 2 wherein said sealing members comprises O-rings.

* * * * *

UNITED STATES PATENT AND TRADEMARK OFFICE
CERTIFICATE OF CORRECTION

PATENT NO. : 5,589,035
DATED : December 31, 1996
INVENTOR(S) : Sundqvist

It is certified that error appears in the above-indentified patent and that said Letters Patent is hereby corrected as shown below:

Column 3, line 12, "an" should read --and--;
Column 4, line 2, "fluid" should read --liquid--.

Signed and Sealed this

Twenty-eighth Day of October, 1997

Attest:

BRUCE LEHMAN

*Attesting Officer*     *Commissioner of Patents and Trademarks*